United States Patent Office 3,160,678
Patented Dec. 8, 1964

3,160,678
FLEXIBLE FILMS FROM UNSATURATED POLYESTERS
Henry Y. Lew, El Cerrito, Calif., assignor to California Research Corporation, San Francisco, Calif., a corporation of Delaware
No Drawing. Filed Nov. 9, 1959, Ser. No. 851,515
18 Claims. (Cl. 260—861)

The present invention relates to the preparation of novel unsaturated polyesters, and to said unsaturated polyesters modified to produce flexible, tough compositions, including compositions having excellent general film properties, such as good tensile strength, tear resistances and dimensional stability, low water absorption, and the like. These materials are useful as packaging films, membranes, flexible coatings, table cloths, shower curtains, and the like.

Polyester resinous compositions prepared by the esterification or polymerization of a glycol, such as ethylene glycol, and an unsaturated dicarboxylic acid, such as maleic or fumaric, in which a portion of the acid is replaced with phthalic acid are known. It is also known to modify said resinous compositions by copolymerization with a compound containing the group $CH_2=C<$, such as styrene. In effecting the copolymerization, a polymerization catalyst, such as benzoyl or lauroyl peroxide or methylethylketone peroxide or tertiary butyl peroxide, with or without an accelerator such as cobalt naphthenate or tertiary amine compounds, is employed. The temperatures of copolymerization can vary from 20° C. to 150° C., depending on the catalyst employed. Curing of the mixture can be started at room temperature and completed at higher temperatures.

Unsaturated polyesters are generally regarded as non-film forming agents, useful, for example, in the preparation of structural laminates and rigid molded materials. Flexible polyesters have been prepared by the incorporation of a long chain saturated acid, such as adipic, but these resins are relatively high in cost. Suffice it to say that unsaturated polyesters as film-forming materials presently do not offer any serious competition to such conventional materials as polyvinyl chloride, polyethylene, and cellophane.

Physical properties which are most important for film applications are tensile strength, elongation, tear resistance, water absorption, and clarity. An ideal film material, particularly for packaging use, should be low-cost, and have high tensile strength and tear resistance for film strength, high clarity for appearance, low elongation for film rigidity, and low water absorption for resistance to moisture. No material found to date has all these properties. In actual practice, low-cost materials with good film strength but some tolerated deficiencies are used for film application. Unless these deficiencies are corrected by further processing, these materials have limited uses. Such is the case with cellophane; it has high water absorption and is thus sensitive to moisture; it is made moisture-proof by coating with a lacquer or only used uncoated for general wrapping purposes, where moisture protection is not needed. However, further processing is undesirable since it adds to the cost of film material. In order to determine what general properties and minimum film strengths are required for film application, reference is made to the properties of the two largest-volume commercial film, namely, cellophane and polyethylene. Cellophane has 4,400–18,600 p.s.i. tensile strength, 15–45% elongation, 110–515 lb./in. tear resistance, very good clarity, and 45–115% water-absorption (uncoated variety), while polyethylene has 1350–2500 p.s.i. tensile strength, 50–600% elongation, 65–575 lb./in. tear resistance, 0–0.8% water absorption, and poor clarity.[1] As

[1] Modern Plastics Encyclopedia 1958.

mentioned above, the main deficiency of cellophane is its high water absorption, whereas the main deficiencies of polyethylene are its lower tensile strength, higher elongation, poor clarity and low melting point. A film with the clarity of cellophane and the low water-absorption of polyethylene and tensile strength, elongation and tear resistance intermediate between the two would be particularly useful in application where neither uncoated cellophane nor polyethylene is suitable—such as for packaging of cigarettes, candy and bread where moisture-proofness and clarity are essential. Films prepared in accordance with this invention have these properties.

Broadly, the present invention is based on the discovery that flexible, resinous compositions can be obtained from unsaturated polyesters, by the proper modification thereof, said unsaturated polyesters being formed by the esterification of an alpha, beta-ethylenically unsaturated dicarboxylic acid or acid anhydride, for example, fumaric acid or maleic anhydride, and about 1 to 5 mols per mol of said unsaturated acid of isophthalic or terephthalic acid or the esters thereof, hereinafter referred to as "phthalic acid material," with a polyalkylene glycol having a molecular weight ranging from about 200 to 600. Particularly useful are the polymers of ethylene and 1,2-propylene glycols having a degree of polymerization such as to give a polyglycol of the specified average molecular weight. More particularly, these materials may be represented by the formula:

$$HO(C_xH_{2x}O)_nC_xH_{2x}OH$$

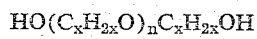

wherein $x$ represents the numeral 2 and 3 for polyethylene glycol and polypropylene glycol, respectively; and $n$, a number ranging from 3 to 12 in the case of the polyethylene glycol, and 3 to 10, in the case of polypropylene glycols. These materials, as well as the polybutylene glycols, are available commercially. The polyglycol material is employed in amounts just sufficient to esterify all of the carboxyl groups of the phthalic acid and unsaturated dicarboxylic acid up to a 5 mol percent excess over and above the amount of glycol material required to esterify the total acid groups. The thus obtained unsaturated polyesters can then be reacted with a modifying copolymerizing vinyl compound containing the polymerizable group, $CH_2=C<$, such as styrene. In general, satisfactory amounts of the vinyl compound range from 30 to 60%, and the unsaturated polyester from 40 to 70% by weight. Other examples of solubilizing monomers, in addition to the preferred styrene, are other aryl mono-olefins, such as ring-substituted styrenes, for example, mono- and polyalkyl styrenes, mono- and polychlorostyrenes, in which the alkyl and chlorine radicals are substituted on the ring, etc. Other type vinyl compounds are vinyl esters, ketones and ethers; vinylidene halides, acrylic and methacrylic acids and their derivatives, e.g., amides, esters and nitriles. Diallyl esters of a saturated dibasic acid and the substituted allyl esters, for example, diethallyl, and dimethallyl esters are also suitable, specific examples being diallyl phthalate, diallyl adipate, sebacate, glutarate, etc.

A convenient method of preparing the compositions of the invention is described and claimed in U.S. Patent No. 2,904,533. In accordance with this procedure, the isophthalic acid is first reacted with the glycol, followed by reaction with the unsaturated aliphatic polybasic acid, for example, fumaric. The unsaturated phthalic acid polyester is then admixed with a solubilizing monomer, for example, styrene, to form a solution. At the mixing stage, an inhibitor, such as hydroquinone or tertiary butylcatechol, is advantageously added to the unsaturated polyester to stabilize the resin and prevent premature gelation or cross-linking. If desired, the stabilizer may be added at a prior time, namely during the preparation of the unsaturated polyester.

As hereinabove indicated, in carrying out the addition polymerization of the polymerizable monomer and unsaturated polyester, a catalyst is employed. Suitable catalysts are the hydroperoxide and peroxide initiators, such as benzoyl peroxide, methylethylketone peroxide, cyclohexanone peroxide, cumene hydroperoxide and the like. These can be employed in the customary amounts of 0.2% to 5.0%, based on the resin-monomer solutions. In addition, certain tertiary amines such as dimethylaniline, diethylaniline and N-ethyl-meta-toluidine and/or cobalt naphthenate (as 6% cobalt solution) as a promoter for the above initiators, are used in amounts of 0.01% to 2% by weight based on resin-monomers solution.

In the preparation of the flexible compositions of the invention, conventional principles are followed, for example, the isophthalic acid or dimethyl isophthalate or terephthalate is heated with the glycol material to reaction temperatures, that is, to a temperature in which water or methyl alcohol is expelled from the system, the reaction being contined to an acid number of below 30, preferably below 10 or until 95% of the theoretical amount of water or methyl alcohol is removed. The reaction is advantageously conducted under an inert atmosphere, for example, nitrogen or carbon dioxide. In the esterification of the phthalic acid material with the glycol, temperatures of the order of 370° F. to 450° F. and reaction times of 6 to 12 hours are usual, generally the longer the cooking time the greater the polyesterification and hence the higher molecular weight of the ester. When the esterification reaction is complete, as evidenced by low acid number or the cessation of water or methyl alcohol formation, the unsaturated aliphatic polybasic acid or acid anhydride, for example, maleic or fumaric, in an amount of about 0.15 to 1 mol per mol of phthalic acid material is added and caused to react with the esterification product of phthalic acid material and glycol. This reaction is also preferably carried out under an inert atmosphere at temperatures usually of the order of 400 to 450° F., for a period of time ranging from 3 hours to 12 hours. The finished resin, when thus proceeding having an acid number below about 30, a calculated molecular weight between 1000 and 4000, preferably 2000 to 3000, and usually a Gardner-Holdt viscosity of G or greater on a 60% resin-40% toluene solution, is then mixed with the desired proportion of copolymerizing vinyl monomer, for example, styrene. Above 150° F. the polyesters are sufficiently fluid to be readily mixed with vinyl monomers. In general, satisfactory amounts of the vinyl compound range from 30 to 60%, while the unsaturated polyester, from 40 to 70%, by weight.

In order to illustrate more fully the practice of the invention, the following examples are given. In the examples, the glycol material was employed in a stoichiometric excess of 2 to 5 mol percent over combined phthalic acid material and unsaturated aliphatic polybasic acid or acid anhydride. The viscosity of the polyester before admixture with styrene was determined on a solution of 60% polyester and 40% toluene using the Gardner-Holdt scale.

The vinyl monomer in the preparation of the film was added to the polyester at a temperature of 150° to 250° F. to give polyester-monomer solution of 60% polyester and 50% vinyl monomer. To 100 parts, by weight, of the polyester-monomer solution were added 0.5 part of Lupersol DDM (60% methylethylketone peroxide in dimethyl phthalate), 1 part Luperco ATC (benzoyl peroxide compounded with tricresyl phosphate, the peroxide assaying 50%), and 0.15 part of 6% cobalt naphthenate. The mixture and catalyst was well mixed, filtered through a cloth screen, degassed in a vacuum desiccator to remove air bubbles, and cast between two sheets of cellophane film separated by a metal spacer to control film thickness to 0.014-0.018 inch. The film was allowed to gel and then cured in an oven for 10-30 minutes at 250° to 300° F.

Example 1

872 parts of polyethylene glycol (molecular weight, 300) and 348 parts of isophthalic acid were charged to a reaction flask provided with a steam-jacketed distillation column for separating the polyethylene glycol from the water of reaction and returning the polyethylene glycol to the reaction vessel. The contents of the flask were blanketed with nitrogen and cooked at 430° F. to an acid number of 6.4. The reaction mixture was then cooled to 400° F. and maleic anhydride in the mol ratio of one mol to 3 mols of isophthalic acid together with 0.12 part of hydroquinone was added, and the whole further cooked at a temperature of 430° F. to an acid number of 8.9. When 90-95% of the water of reaction was removed, the steam-jacketed distillation column was replaced by an air-cooled distillation column. The maximum pot temperature throughout the reaction was 430° F., and the maximum overhead temperature was 230° F. Final Gardner-Holdt viscosity for 60% polyester-40% toluene was F-G.

The finished film from the polyester was very flexible and had the following properties:

Ultimate tensile strength, p.s.i. _____ 750
Ultimate elongation, percent _____ 150
Initial modulus in tension, $10^5$ p.s.i. _____ 0.01

Example 2

Using the equipment and substantially the same procedure as in Example 1, an unsaturated polyester was prepared from dimethyl terephthalate ester, maleic anhydride and polyethylene glycol (molecular weight, 300) in a mol ratio of dimethyl terephthalate to maleic anhydride of 3:1. The ingredients were cooked to an acid number of 11.2 and to a Gardner-Holdt viscosity of I-J for 60% polyester-40% toluene.

The finished film was determined to have the following properties:

Ultimate tensile strength, p.s.i. _____ 950
Ultimate elongation, percent _____ 240
Initial modulus in tension, $10^5$ p.s.i. _____ 0.01
Water absorption (ASTM D570-54T), percent ____ 0.8
Tear resistance, lb./in. thickness (ASTM D1004-49T) _____ 150

Example 3

Substantially the same equipment and procedure and mol ratios of ingredients as employed in Example 2 were treated, except that dimethyl terephthalate was replaced with phthalic anhydride. The resin was cooked to an acid number of 14.5 and to a Gardner-Holdt viscosity of E for 60% polyester-40% toluene. The film obtained from this resin had the following properties:

Ultimate tensile strength, p.s.i. _____ 450
Ultimate elongation, percent _____ 60
Initial modulus in tension, $10^5$ p.s.i. _____ 0.04
Water absorption (ASTM D570-54T), percent ____ 7.3

It will be noted that this film is inferior to that of Examples 1 and 2 from the standpoint of ultimate tensile strength.

Example 4

Example 1 was repeated except that the isophthalic-maleic mol ratio was 1:1. The acid number of the resin was 12.8 and had a Gardner-Holdt viscosity of I for 60% polyester-40% xylene. A flexible film was obtained.

Example 5

Example 1 was repeated except that the isophthalic acid-maleic anhydride ratio was 5:1. The acid number of the resin was 9 and the viscosity for 60% polyester-40% toluene was F, Gardner-Holdt. A film from this material was very flexible.

Example 6

Example 1 was repeated except that the polyethylene glycol of a molecular weight of 300 was replaced by a polyethylene glycol of molecular weight, 200, the polyester cooked to an acid number of 13.8 and to a viscosity of P, Gardner-Holdt. A film prepared from this material as before had the following properties:

| | |
|---|---|
| Ultimate tensile strength, p.s.i. | 880 |
| Ultimate elongation, percent | 70 |
| Initial modulus in tension, $10^5$ p.s.i. | 0.05 |
| Water absorption, percent | 1.0 |

Example 7

Example 1 was repeated except that dimethyl isophthalate was employed in place of isophthalic acid and the resin cooked to an acid number of 12 and to a viscosity of P, Gardner-Holdt. The properties of the film were:

| | |
|---|---|
| Ultimate tensile strength, p.s.i. | 900 |
| Ultimate elongation, percent | 150 |
| Initial modulus in tension, $10^5$ p.s.i. | 0.05 |

Example 8

A polyester was prepared employing polyethylene glycol (molecular weight, 600), dimethyl isophthalate and maleic anhydride in amounts of 1 mol of the ester to 1 mol of maleic. The polyester was cooked to an acid number of 7.8 and a viscosity of N, Gardner-Holdt. The film from this resin had an

| | |
|---|---|
| Ultimate tensile strength, p.s.i. | 950 |
| Ultimate elongation, percent | 195 |
| Tear resistance, lb./in. | 255 |

Example 9

A polyester was prepared from isophthalic acid, maleic anhydride and triethylene glycol in accordance with the procedure of Example 1. The isophthalic acid was employed in an amount of 1 mol to 1 mol of maleic anhydride. The polyester was cooked to an acid number of 7 and a viscosity of Q-R.

| | |
|---|---|
| Ultimate tensile strength, p.s.i. | 5000 |
| Ultimate elongation, percent | 7 |
| Initial molulus in tension, $10^5$ p.s.i. | 2.1 |
| Water absorption, percent | 0.30 |

The film was very brittle, and hence, unsatisfactory as a film material.

Example 10

Example 1 was repeated, except that the maleic anhydride was replaced with fumaric acid in the same amounts. The polyester was cooked to an acid number of 10 and a Gardner-Holdt viscosity of E-F. A very flexible film was prepared from this material.

Example 11

Example 1 was repeated except that maleic anhydride was replaced by the same molar amounts of fumaric acid, and with polyethylene glycol having a molecular weight of 200. The polyester was cooked to an acid number of 18.2. Gardner-Holdt viscosity, G-H. A film from this material showed:

| | |
|---|---|
| Ultimate tensile strength, p.s.i. | 1400 |
| Ultimate elongation, percent | 90 |
| Initial modulus in tension, $10^5$ p.s.i. | 0.05 |

Example 12

Three mols isophthalic acid, 1 mol fumaric acid and polyethylene glycol (molecular weight, 200) were reacted to an acid number of 15 and viscosity G, Gardner-Holdt.

The finished resin was then diluted with methyl methacrylate monomer in proportions of 60% polyester, 40% methyl methacrylate, the mixture being cured as before. The finished film had the following characteristics.

| | |
|---|---|
| Ultimate tensile strength, p.s.i. | 2500 |
| Elongation, percent | 70 |
| Initial modulus in tension, $10^5$ p.s.i. | 0.15 |
| Tear resistance, lb./in. | 155 |

The film from 60% polyester, 20% methyl methacrylate and 20% styrene had the following properties:

| | |
|---|---|
| Ultimate tensile strength, p.s.i. | 2000 |
| Elongation, percent | 78 |

Example 13

The procedure of Example 1 was followed using 683 parts of polypropylene glycol having a molecular weight of 150 and 545 parts of isophthalic acid with isophthalic acid to maleic anhydride mol ratio of 3 to 1. The polyester was cooked to an acid number of 13.6 and a viscosity of E, Gardner-Holdt. A film prepared from this polyester was very brittle and had the following properties:

| | |
|---|---|
| Ultimate tensile strength, p.s.i. | 7500 |
| Elongation, percent | 3 |
| Initial modulus in tension, $10^5$ p.s.i. | 2.9 |
| Water absorption (ASTM D570-54T), percent | 0.08 |

Example 14

Two mols of isophthalic acid, 1 mol of fumaric acid, and 3.12 mols of polypropylene glycol of 250 molecular weight was cooked to an acid number of 15.8 and a Gardner-Holdt viscosity of G-H (on a 60% polyester-40% toluene solution). The film from a 60% polyester and 40% styrene solution had:

| | |
|---|---|
| Ultimate tensile strength, p.s.i. | 1350 |
| Elongation, percent | 95 |

Example 15

One mol of dimethyl isophthalate, 1 mol of maleic anhydride, and 2.1 mols of polypropylene glycol (molecular weight, 425) were cooked to an acid number of 10.6 and a viscosity of G. Film from this polyester had the following properties:

| | |
|---|---|
| Ultimate tensile strength, p.s.i. | 700 |
| Elongation, percent | 140 |

As has been shown, tough, flexible compositions, including flexible films, having satisfactory film properties can be prepared economically from modified unsaturated polyesters. The compositions prepared in accordance with the invention, moreover, possess certain superior properties over conventional films. For example, the materials of the invention are thermosetting, that is, have no melting points, as opposed to polyethylene films which are thermoplastic in nature. Also, the compositions of the present invention do not require a plasticizer conventionally employed in the vinyl-type films, the loss of which in vinyl films causes embrittlement. Finally, as above indicated, the present compositions have good moisture resistance characteristics as compared with cellophane, which is normally provided with a coating to decrease water absorption by the cellophane.

I claim:

1. An unsaturated polyester composition having a calculated molecular weight between about 1,000 and 4,000, and an acid number below about 30, and which is useful in the preparation of flexible film, which polyester is the condensation product of the following reactants as essentially the sole reactants:
   (a) a phthalic acid material selected from the group consisting of isophthalic acid, terephthalic acid, and lower monohydric alcohol esters thereof;
   (b) an aliphatic acid-reacting material selected from the group consisting of fumaric acid, maleic acid, and maleic anhydride; and (c) a polyalkylene glycol material selected from the group consisting of polyethylene glycol and polypropylene glycol having a molecular weight within the range 200 to 600;

said phthalic acid material being employed in proportions within the range 1 to 5 mols per mol of aliphatic acid-reacting material, and said glycol material in an amount just sufficient to neutralize all carboxyl groups up to a 5 mol percent excess.

2. A composition according to claim 1 wherein the polyalkylene glycol is polyethylene glycol.

3. A composition according to claim 1 wherein the polyalkylene glycol is polypropylene glycol.

4. A composition according to claim 1 wherein the phthalic acid material is isophthalic acid.

5. A composition according to claim 1 wherein phthalic acid material is terephthalic acid.

6. A composition according to claim 1 wherein the aliphatic acid-reacting material is maleic anhydride.

7. A composition according to claim 6 wherein the phthalic acid material is terephthalic acid.

8. A composition according to claim 1 wherein the phthalic acid material is isophthalic acid, the polyalkylene glycol is polyethylene glycol, and the aliphatic acid-reacting material is maleic anhydride.

9. A flexible film of a copolymer consisting essentially, by weight, of (1) 30 to 60 percent copolymerizable compound containing the polymerizable group $CH_2=C<$; and (2) 40 to 70 percent unsaturated polyester having an acid number below about 30 and a calculated molecular weight between 1,000 and 4,000, which polyester is the condensation product of the following reactants as essentially the sole reactants:

(a) phthalic acid material selected from the group consisting of isophthalic acid, terephthalic acid, and lower monohydric alcohol esters thereof;

(b) an aliphatic acid-reacting material selected from the group consisting of $\alpha,\beta$-ethylenically unsaturated aliphatic dibasic acids and their anhydrides; and (c) a polyalkylene glycol material of the formula $HO(C_xH_{2x}O)_nC_{2x}OH$, wherein x is a numeral greater than 1 but less than 4, and n is a numeral such as to give a molecular weight within the range 200 to 600;

said phthalic acid material being employed in proportions within the range 1 to 5 mols per mol of aliphatic acid-reacting material, and said glycol material in an amount just sufficient to neutralize all carboxyl groups up to a 5 mol percent excess.

10. A film according to claim 9 wherein the phthalic acid material is isophthalic acid.

11. A film according to claim 9 wherein the polyalkylene glycol is polyethylene glycol.

12. A film according to claim 9 wherein the aliphatic acid-reacting material is maleic anhydride.

13. A film according to claim 9 wherein the polyalkylene glycol is polypropylene glycol.

14. A film according to claim 9 wherein the copolymerizable compound is styrene.

15. A film according to claim 9 wherein the copolymerizable compound is methyl methacrylate.

16. A film according to claim 9 wherein the phthalic acid material is terephthalic acid.

17. A film according to claim 9 wherein the phthalic acid material is isophthalic acid, the aliphatic dibasic acid material is maleic anhydride, and the polyalkylene glycol is polyethylene glycol.

18. A film according to claim 9 wherein the aliphatic dibasic acid material is fumaric acid.

References Cited in the file of this patent
UNITED STATES PATENTS

| | | |
|---|---|---|
| 2,595,625 | Agnew | May 6, 1932 |
| 2,255,313 | Ellis | Sept. 9, 1941 |
| 2,532,475 | Anderson | Dec. 5, 1950 |
| 2,562,787 | Blair | Aug. 7, 1951 |

UNITED STATES PATENT OFFICE
CERTIFICATE OF CORRECTION

Patent No. 3,160,678                  December 8, 1964

Henry Y. Lew

It is hereby certified that error appears in the above numbered patent requiring correction and that the said Letters Patent should read as corrected below.

Column 3, line 65, for "50%" read -- 40% --.

Signed and sealed this 13th day of April 1965.

(SEAL)
Attest:

ERNEST W. SWIDER                  EDWARD J. BRENNER
Attesting Officer                    Commissioner of Patents